April 9, 1940.  W. W. HERROLD  2,196,587
DISPLAY DEVICE
Filed June 24, 1937
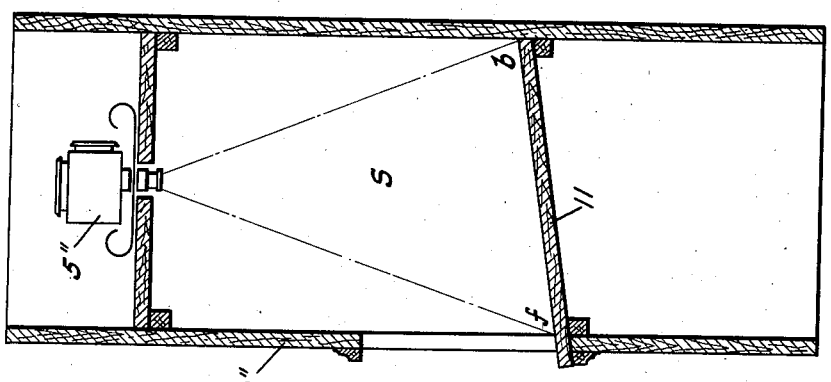
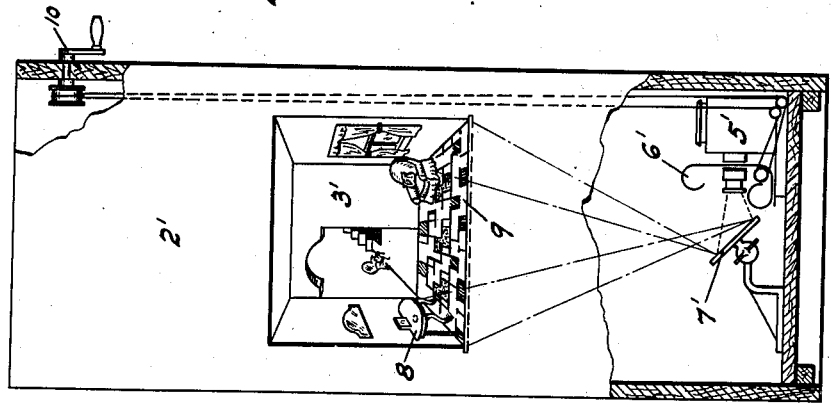
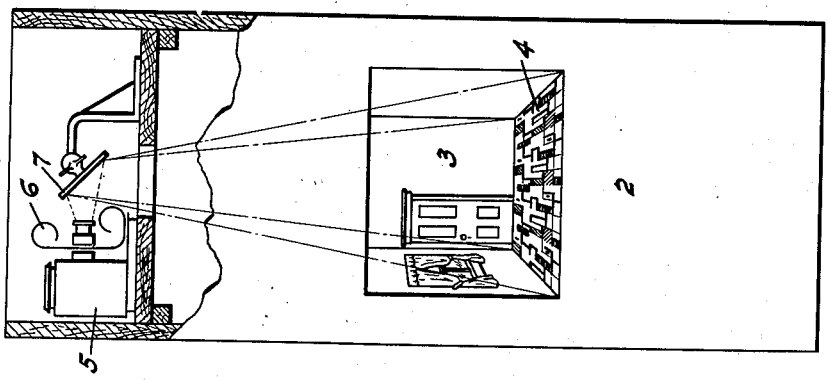
Inventor
Walter W. Herrold
by
Walter F. Kaufman
Attorney Patented Apr. 9, 1940

2,196,587

UNITED STATES PATENT OFFICE 2,196,587

DISPLAY DEVICE

Walter W. Herrold, Lancaster, Pa., assignor to Armstrong Cork Company, Lancaster, Pa., a corporation of Pennsylvania Application June 24, 1937, Serial No. 150,014

3 Claims. (Cl. 88—24)

This invention relates to display devices and more particularly to a device for the convenient and expeditious showing of various and sundry surface covering patterns in conjunction with the replica of a room or the like in connection with which a surface covering material is to be used.

Surface covering materials, such for example as linoleum, are difficult to display to prospective customers because of their weight and the widths in which they are customarily sold. It is impracticable to lay a great number of linoleum patterns on a floor to demonstrate differences in color, texture, pattern, scale and the like, and salesmen are consequently hampered in attempting to show color schemes and pattern effects with such materials.

According to the present invention, a three-dimensional set in simulation of a room is constructed in miniature, with or without provision for variations in color decoration, and a series of images of various patterned goods is cast upon the surface of the set corresponding to the surface to which the linoleum or similar surface covering is to be applied. In this manner, a great number of different patterns and different colors may be viewed with little effort and no delay, and in addition, artistic floors not in commercial production, but available for customers on order, may be displayed at little cost and effort. If one of the latter type of floors should be selected by the prospective customer, the projecting device, or one similar, used to show the image of such floor, may be used to project the image to large scale, whereby artistic designs and unusual combinations not customarily available, and not readily occurring to the ordinary flooring contractor or dealer, may be readily duplicated by merely showing the image to full scale, enabling the layer or flooring contractor to mark the goods directly to the proper scale for the particular room to which the design is to be applied.

Referring to the accompanying drawing illustrating certain preferred embodiments of my invention, Figure 1 shows a front elevation partly broken away of one form of my display device;

Figure 2 shows a front elevation partly broken away of a different form of my display device; and Figure 3 shows a further modification in sectional side elevation.

Referring first to Figure 1, there is shown a front wall 2 having an opening therein through which is visible a set 3 having the suggestion of windows and a door to give scale to the set and having a reflecting surface 4 on the floor thereof upon which is projected an image of a floor covering by a projector 5 which throws the image from a film 6 upon an angularly adjusted mirror 7 to the surface 4. The mirror 7 is adjustable to permit centering of the image on the surface 4 and the film 6 may be traversed through the projector 5 in a step by step manner to show the effect of different floor patterns in combination with the set 3.

In Figure 2, I have shown an arrangement in which it is possible to have model furniture 8 in the set 3', inasmuch as the image of the flooring material is projected from a film 6' by a projector 5' upon a mirror 7' against a translucent screen 9, the whole of the set being viewed through an opening in the wall 2'. The film 6' is traversed with a remote control 10 by the operator at will. Various patterns may be shown with the miniature furniture 8 moved about at will without disturbing the image of the floor.

In Figure 3, I have shown a further arrangement in which a projector 5" is arranged vertically to cast an image upon an inclined surface 11. The advantages of inclining the surface 11 are that it makes the image more readily observable through an opening in the wall 2", and that the back part of the surface 11, indicated at b, being higher than the front part of the surface 11, indicated at f, will cut the stream of light projected from the projector 5" closer to the focal point, whereby the image will be somewhat smaller at b than at f. Thus, the floor as viewed through the opening in the front wall 2" will exhibit a feeling of perspective, and the side walls, one of which is indicated at s may be moved closer together at the back of the display device than they are at the front of the display device, heightening the feeling of perspective without cutting the image on the surface 11.

My invention contemplates the employment of a non-planar mirror in the arrangement shown in Figures 1 and 2 to provide the projection of the image of a floor which is narrower at the back of the display device than it is at the front. I prefer this method inasmuch as the film from which the projection is made is thus capable, when used without such mirror, of projecting a flat geometrically symmetrical image, enabling the contractor or layer to readily lay out full sized floors, which may have been selected for installation, by merely casting the appropriate image to the scale desired upon the material to be used and marking the same from the image so cast.

My device, of course, may be used to equal advantage in displaying wall or ceiling coverings, and the principles of operation herein set forth will enable its ready adaptation to such use. When used in displaying floor coverings, the side walls of the set (such as shown at s), may, of course, be varied or used interchangeably in various colors to demonstrate color combinations.

While I have illustrated and described certain preferred embodiments of my invention, it will be understood that the invention is not so limited but may be otherwise embodied within the scope of the following claims:

I claim:

1. In a display device, a projection cabinet having a face panel with an opening therein, a miniature room formed in said cabinet and having substantially closed vertically arranged back and side wall areas and a planar, translucent projection screen forming the floor area of said miniature room enclosed on three sides by said wall areas, said floor area being capable of receiving miniature furniture positioned thereon, the floor and wall areas being visible through the opening in the face panel, means mounted in the cabinet for projecting floor covering designs onto said translucent floor area in a generally vertical direction from below said translucent floor area, whereby the floor area is the only one of said areas illuminated by the projection means and the projected image will be unobstructed by and extend under miniature furniture placed on said floor area, and appears in its conventional position.

2. In a display device, a projection cabinet having a face panel with an opening therein, a miniature room formed in said cabinet and having substantially closed vertically arranged back and side wall areas and a planar projection screen forming the floor area of said miniature room and closed on three sides by said wall areas, said floor area being of generally trapezoidal shape in plan and being of greatest width at said opening and converging toward said back wall area, projection means mounted in the cabinet including a light source, an image carrying transparency and a nonplanar mirror effective for distorting an image projected from said transparency to cause the same to assume a trapezoidal shape corresponding to the shape of said floor area whereby the image when viewed through the opening will exhibit a feeling of perspective.

3. A display device in accordance with claim 1 in which the means for projecting the floor covering designs onto the translucent floor area comprises projection means mounted in the cabinet including a light source, an image carrying transparency and a nonplanar mirror effective for distorting an image projected from said transparency to cause the same to assume a trapezoidal shape whereby the image when viewed through the opening will exhibit a feeling of perspective.

WALTER W. HERROLD.